United States Patent
Hirao et al.

(10) Patent No.: US 10,571,190 B2
(45) Date of Patent: Feb. 25, 2020

(54) LIQUEFIED GAS COOLING APPARATUS

(71) Applicant: MITSUBISHI HEAVY INDUSTRIES THERMAL SYSTEMS, LTD., Tokyo (JP)

(72) Inventors: Toyotaka Hirao, Tokyo (JP); Kenji Ueda, Tokyo (JP); Yasushi Watanabe, Tokyo (JP)

(73) Assignee: MITSUBISHI HEAVY INDUSTRIES THERMAL SYSTEMS, LTD., Tokyo (JP)

( * ) Notice: Subject to any disclaimer, the term of this patent is extended or adjusted under 35 U.S.C. 154(b) by 29 days.

(21) Appl. No.: 15/538,094

(22) PCT Filed: Dec. 24, 2015

(86) PCT No.: PCT/JP2015/086134
§ 371 (c)(1),
(2) Date: Jun. 20, 2017

(87) PCT Pub. No.: WO2016/111188
PCT Pub. Date: Jul. 14, 2016

(65) Prior Publication Data
US 2017/0350649 A1    Dec. 7, 2017

(30) Foreign Application Priority Data
Jan. 5, 2015 (JP) .................... 2015-000503

(51) Int. Cl.
*F25J 1/02* (2006.01)
*F25J 1/00* (2006.01)

(52) U.S. Cl.
CPC ........... *F25J 1/0298* (2013.01); *F25J 1/0022* (2013.01); *F25J 1/0052* (2013.01); *F25J 1/0057* (2013.01);
(Continued)

(58) Field of Classification Search
CPC ........ F25J 1/0052; F25J 1/0298; F25J 1/0269; F25J 1/0294; F25J 1/0284; F25J 1/0252; F25J 1/0022; F25J 2280/20; F25J 2230/20
See application file for complete search history.

(56) References Cited

U.S. PATENT DOCUMENTS 3,413,816 A    12/1968   De Marco
3,527,059 A *   9/1970   Rust .................... F04D 27/0269
                                                                          62/115
(Continued)

FOREIGN PATENT DOCUMENTS

CN        1685190 A    10/2005
CN      103629893 A    3/2014
(Continued)

OTHER PUBLICATIONS

International Search Report dated Mar. 22, 2016 for International Application No. PCT/JP2015/086134 with an English Translation.
(Continued)

*Primary Examiner* — Brian M King
(74) *Attorney, Agent, or Firm* — Birch, Stewart, Kolasch & Birch, LLP

(57) ABSTRACT

A liquefied gas cooling apparatus including: a gas flow path for carrying a liquefied gas that is liquefied by cooling; and a refrigeration unit including a refrigerating cycle formed by an evaporator for cooling the liquefied gas flowing through the gas flow path, a compressor, a condenser, and a throttle expansion unit. The compressor is driven through an electric motor contained in a sealed housing together with a compressor mechanism.

12 Claims, 5 Drawing Sheets

(52) U.S. Cl.
CPC .......... *F25J 1/0236* (2013.01); *F25J 1/0248* (2013.01); *F25J 1/0252* (2013.01); *F25J 1/0269* (2013.01); *F25J 1/0279* (2013.01); *F25J 1/0284* (2013.01); *F25J 1/0294* (2013.01); *F25B 2400/06* (2013.01); *F25B 2600/021* (2013.01); *F25J 2230/20* (2013.01); *F25J 2230/22* (2013.01); *F25J 2280/20* (2013.01); *Y02B 30/741* (2013.01)

(56) References Cited

U.S. PATENT DOCUMENTS

| | | | |
|---|---|---|---|
| 3,548,606 | A | 12/1970 | Kuerston |
| 4,037,426 | A | 7/1977 | Rojey |
| 4,698,080 | A | 10/1987 | Gray et al. |
| 6,105,390 | A | 8/2000 | Bingham et al. |
| 6,425,263 | B1 | 7/2002 | Bingham et al. |
| 6,640,586 | B1 | 11/2003 | Baudat et al. |
| 7,114,351 | B2 * | 10/2006 | Jones, Jr. .................. C10L 3/10 62/611 |
| 2003/0159462 | A1 | 8/2003 | Fanning et al. |
| 2004/0118153 | A1 | 6/2004 | Sawchuk et al. |
| 2004/0129020 | A1 | 7/2004 | Jones, Jr. et al. |
| 2005/0126219 | A1 | 6/2005 | Petrowski et al. |
| 2006/0112726 | A1 | 6/2006 | Sawchuk et al. |
| 2007/0089437 | A1 | 4/2007 | Singh et al. |
| 2009/0090131 | A1 | 4/2009 | Kuo et al. |
| 2009/0223245 | A1 | 9/2009 | Heinbokel |
| 2009/0232663 | A1 | 9/2009 | Mirsky et al. |
| 2010/0126214 | A1 | 5/2010 | Paradowski et al. |
| 2010/0257895 | A1 * | 10/2010 | Balling .................. F04D 25/04 62/611 |
| 2010/0281915 | A1 | 11/2010 | Roberts et al. |
| 2013/0094974 | A1 | 4/2013 | Mirsky et al. |
| 2013/0129528 | A1 | 5/2013 | Mirsky et al. |
| 2014/0053599 | A1 | 2/2014 | Byfield |
| 2014/0190205 | A1 | 7/2014 | Bonnissel et al. |
| 2014/0283550 | A1 | 9/2014 | Bonne et al. |

FOREIGN PATENT DOCUMENTS

| | | |
|---|---|---|
| EP | 1062466 A4 | 11/2002 |
| JP | 51-150757 A | 12/1976 |
| JP | 59-52185 A | 3/1984 |
| JP | 61-29657 A | 2/1986 |
| JP | 64-24185 A | 1/1989 |
| JP | 3-160285 A | 7/1991 |
| JP | 8-178480 A | 7/1996 |
| JP | 10-246526 A | 9/1998 |
| JP | 11-83133 A | 3/1999 |
| JP | 2001-271753 A | 10/2001 |
| JP | 2002-168545 A | 6/2002 |
| JP | 2006-501432 A | 1/2006 |
| JP | 2006-504928 A | 2/2006 |
| JP | 2007-514098 A | 5/2007 |
| JP | 2008-267722 A | 11/2008 |
| JP | 2009-27815 A | 2/2009 |
| JP | 2010-261038 A | 11/2010 |
| JP | 2011-185104 A | 9/2011 |
| JP | 2012-513005 A | 6/2012 |
| JP | 2013-61124 A | 4/2013 |
| JP | 2014-66396 A | 4/2014 |
| WO | WO 2006/087006 A1 | 8/2006 |
| WO | WO 2008/136117 A1 | 11/2008 |
| WO | WO 2012/057626 A2 | 5/2012 |
| WO | WO 2012/122114 A2 | 9/2012 |

OTHER PUBLICATIONS

Written Opinion dated Mar. 22, 2016 for International Application No. PCT/JP2015/086134 with an English Translation.
Extended European Search Report dated Nov. 6, 2018 issued in corresponding European Patent Application No. 15877061.0.
Tom Fuggle, "Floating LNG—An Overview of compression options", GPA Europe Conference Dresser-Rand, Feb. 25, 2010, pp. 1-24.
Jiang Jihuan, "Comprehensive Management for Equipment in Construction Company", the China Construction Industry Pres., pp. 261-267 published Sep. 30, 1988.
Office Action dated Feb. 3, 2019 in corresponding Chinese Application No. 210580072172.2 with an English Translation.
Office Action dated Jan. 22, 2019 in related Japanese Application No. 2018-043129 with an English Translation.

* cited by examiner

LIQUEFIED GAS COOLING APPARATUS

TECHNICAL FIELD

The present invention relates to a cooling apparatus (hereinafter simply referred to as a liquefied gas cooling apparatus) for cooling liquefied gas for liquefaction.

BACKGROUND ART

For example, a liquefied natural gas (hereinafter simply referred to as LNG) is generated by first precooling a natural gas at room temperature under normal pressure to about −30° C., further cooling the resulting gas for liquefaction, and then further supercooling it to −162° C. This cooling process employs refrigeration units using various refrigerants. Each refrigeration unit has a compressor, a condenser, a throttle expansion unit, and an evaporator connected in sequence in a refrigerant path, thereby forming a closed refrigerating cycle.

PTLs 1 to 5 each disclose a liquefied gas cooling apparatus for an LNG and the like, using a refrigeration unit as described above. These liquefied gas cooling apparatuses each include different refrigeration units having needed performances for a precooling process and a liquefaction process.

CITATION LIST

Patent Literature

{PTL 1}
U.S. Patent Application, Publication No. 2009/0090131
{PTL 2}
U.S. Patent Application, Publication No. 2010/0281915 (corresponding to Japanese Unexamined Patent Application, Publication No. 2010-261038)
{PTL 3}
U.S. Patent Application, Publication No. 2010/0257895
{PTL 4}
U.S. Patent Application, Publication No. 2014/0190205
{PTL 5}
U.S. Patent Application, Publication No. 2014/0283550

SUMMARY OF INVENTION

Technical Problem

In a refrigeration unit in such a liquefied gas cooling apparatus, a drive shaft of a compressor in a refrigerating cycle is coupled to an output shaft of a gas turbine or electric motor to drive the compressor. This compressor requires, at regular operation intervals, change of consumable parts, such as bearings, involving the collection of the refrigerant from the refrigerating cycle for maintenance. Hence, the liquefied gas cooling apparatus cannot be operated during that time, which leads to a problem of, for example, interruption of LNG production.

Meanwhile, the compressor is driven via a turbine shaft or motor shaft, which causes an infinitesimal amount of refrigerant leaking from the shaft sealing portion of the compressor drive shaft; thus, the refrigerant needs to be regularly added. Compressors and turbines are arranged in lines by group; thus, rigid constraints are imposed on arrangement of component machines in plants with small installation spaces. In addition, in some cases during maintenance, some of the refrigeration units in multiple grids are halted to avoid the halt of the entire system and the other refrigeration units are operated for maintenance. At this time, the drive motors in the halted compressors or the power sections of the inverters may be in an electrically conducting state, which may become dangerous for maintenance work.

It is an object of the present invention, which has been made in such a background, to provide a liquefied gas cooling apparatus that can prevent refrigerant leakage from shaft sealing portions, ensure the ease of handling and safety during maintenance, and increase the flexibility in the layout of the plant components to ease machine layout constraints in small spaces.

Solution to Problem

To solve the aforementioned problem, a liquefied gas cooling apparatus of the present invention employs the following solutions.

To be specific, a liquefied gas cooling apparatus of the present invention includes: a gas flow path for carrying a liquefied gas that is liquefied by cooling; and a refrigeration unit including a refrigerating cycle formed by an evaporator for cooling the liquefied gas flowing through the gas flow path, a compressor, a condenser, and a throttle expansion unit. The compressor includes: a sealed housing; a compressor mechanism contained in the housing; and an electric motor contained in the housing together with the compressor mechanism. The compressor is driven through the electric motor.

According to the present invention, the shaft sealing portions of the compressor drive shaft are removed, thereby preventing a slight amount of refrigerant leakage due to the presence of the shaft sealing portions.

This can omit maintenance for regular refill of refrigerant and reduce maintenance costs, refrigerant costs for additional refill, and the like.

Further, the compressor is a housing containing an electric motor, thereby removing a necessity of separately providing a driver for the compressor. Hence, the installation space for the refrigeration unit is reduced and the constraints of the layout of component machines in the plant are eased, which facilitates use in small-space plants.

In addition, as for the liquefied gas cooling apparatus according to the present invention, in the aforementioned liquefied gas cooling apparatus, the refrigeration unit is modularized into multiple refrigeration modules connected in parallel or series to the gas flow path to achieve needed cooling performance.

According to the present invention, to provide the liquefied gas cooling apparatus having the same performance, installation of multiple low-capacity refrigeration modules results in high flexibility in the layout of the machines compared with installation of a single high-capacity refrigeration unit.

Thus, in plants with small installation spaces, machine layout constraints can be eased and the capacity size of the liquefied gas cooling apparatus can be flexibly selected.

In addition, during regular maintenance carried out at predetermined operation intervals for a compressor of the refrigeration unit while the operation of the system is continued with the operation of only the corresponding refrigeration module in the halt state, the corresponding compressor can be independently subjected to maintenance, so that the usage rate of the system can be increased.

Further, as for a liquefied gas cooling apparatus of the present invention, in the aforementioned liquefied gas cooling apparatus, the compressor is modularized into multiple compressor modules connected in parallel to the refrigerating cycle to achieve needed cooling performance.

According to the present invention, to provide the liquefied gas cooling apparatus having the same performance, installation of multiple low-capacity compressor modules results in high flexibility in the layout of the machines compared with installation of a single high-capacity compressor.

Thus, in plants with small installation spaces, machine layout constraints can be eased and the capacity size of the liquefied gas cooling apparatus can be flexibly selected.

In addition, during regular maintenance carried out at predetermined operation intervals for a compressor of the refrigeration unit while the operation of the system is continued with the operation of only the corresponding compressor module in the halt state, the corresponding compressor can be independently subjected to undergo maintenance, so that the usage rate of the system can be increased.

Further, as for a liquefied gas cooling apparatus of the present invention, in any one of the aforementioned liquefied gas cooling apparatuses, the electric motor of the compressor is provided with a relay to a power feeding circuit therefor.

According to the present invention, during regular maintenance of the compressor, the electric path to the compressor is blocked through the relay provided to the power feeding circuit for the electric motor, thereby allowing for maintenance.

Accordingly, the power section of the compressor halted for maintenance can be brought into an electrically non-conducting state for performing maintenance, so that the operator's safety can be ensured.

Further, as for a liquefied gas cooling apparatus of the present invention, in the aforementioned liquefied gas cooling apparatus, the electric motor of the compressor can receive electric power from a power source via a grid interconnection converter and an inverter, and is provided with the relay to the respective power feeding circuit therefor.

According to the present invention, during regular maintenance of the compressor, the electric path to the compressor is blocked through the relay provided to the power feeding circuit for the electric motor of each compressor connected through the grid interconnection converter and the inverter, thereby allowing for maintenance.

Accordingly, the power section of the compressor halted for maintenance can be brought into an electrically non-conducting state for performing maintenance, so that the operator's safety can be ensured.

Further, as for a liquefied gas cooling apparatus of the present invention, in the aforementioned liquefied gas cooling apparatus, the relay is turned on/off according to the opening/closing of open/close valves for maintenance provided on inlet and outlet sides of the compressor.

According to the present invention, after a lapse of the regular maintenance time for the compressor, the compressor is brought into a halt state. If the open/close valves for maintenance provided at its inlet and outlet are closed, the relay is turned off according to that action and the electric path to the compressor can be blocked.

Thus, when the compressor is subjected to maintenance, its power section can be reliably brought into an electrically non-conducting state, thereby more reliably ensuring the maintenance operator's safety.

Further, as for a liquefied gas cooling apparatus of the present invention, in the aforementioned liquefied gas cooling apparatus, when the compressor is artificially or automatically halted after a lapse of a predetermined operation time, the open/close valves for maintenance are manually or automatically closed, the closing of the open/close valves are detected to turn off the relay, and an electric path to the compressor is blocked to get the compressor ready for the maintenance.

According to the present invention, if the controller or the like counts the regular maintenance time (operation time) of the compressor and the compressor is artificially or automatically halted for example, the open/close valves for maintenance are manually or automatically closed, which is detected by the controller, or the like so that the relay is turned off.

Accordingly, the electric path to the compressor is blocked so that its power section can be brought into an electrically non-conducting state and the compressor can be ready for maintenance.

Consequently, the regular maintenance of the compressor and the process before the maintenance can be reliably controlled and the operator's safety can be ensured.

Further, as for a liquefied gas cooling apparatus of the present invention, in any one of the aforementioned liquefied gas cooling apparatuses, the number of refrigeration modules or compressor modules to operate is controlled according to needed cooling performance dependent on variations in the flow rate of the liquefied gas and in the temperature of the liquefied gas flowing in.

According to the present invention, the refrigeration modules or the compressor modules are operated while the number of these modules is controlled according to fluctuations in the flow rate of the liquefied gas and in the temperature of the gas flowing in, so that the optimum performance for the cold energy needed for the cooling of the liquefied gas can be provided.

This saves excess electric power consumed for the cooling operation for the liquefied gas, resulting in a lean cooling operation.

Further, as for a liquefied gas cooling apparatus of the present invention, in the aforementioned liquefied gas cooling apparatus, the performances of the refrigeration modules or compressor modules are adjustable by the respective inverters, a comparison is performed between an efficiency produced by controlling the number of modules to operate, and an efficiency produced by adjusting the performance by controlling the rotation speed of the compressor, and adjustment is performed by one of these with higher efficiency.

According to the present invention, the range of the performances of the refrigeration modules or the compressor modules can be adjusted by the inverters in such a manner that a comparison is performed between the efficiency produced by reducing the number of modules to operate, and the efficiency produced by reducing the performance by reducing the rotation speed of the compressor, and the adjustment can be performed by either of these with higher efficiency.

For example, if the efficiency produced by reducing the number of modules to operate is higher, a control is performed such that the number of modules to operate is reduced, so that the electric power consumed for the cooling operation is minimized.

As for the refrigeration unit, in particular, which exchanges heat with a liquefied gas the temperature of which greatly changes with sensible heat variations, the performance quality relative to the rotation speed greatly changes depending on the temperature range in which it is used; therefore, the efficiency is preferably calculated for different estimated operation conditions. Consequently, excess electric power consumed for the cooling operation can be minimized.

Further, as for a liquefied gas cooling apparatus of the present invention, in the aforementioned liquefied gas cooling apparatus, to select control of the number of refrigeration modules or compressor modules to operate or control of the rotation speed of the compressor, maintenance cost per operation time of the compressor calculated by dividing the cost of regular maintenance of the compressor by maintenance interval is added to electric power cost, and comparison and determination are then made.

According to the present invention, to select the control of the number of modules to operate or the control of the rotation speed of the compressor, the maintenance cost per operation time of the compressor can be added to the electric power cost and comparison and determination can then be made. Hence, a cooling operation with high efficiency can be performed considering the electric power consumption and the maintenance cost.

As for the refrigeration unit, in particular, which exchanges heat with a liquefied gas the temperature of which greatly changes with sensible heat variations, the load on the compressor changes depending on the temperature range in which it is used. For this reason, the coefficient of maintenance cost and the maintenance interval for the compressor are preferably variable with the temperature range in which it is used.

Further, as for a liquefied gas cooling apparatus of the present invention, in any one of the aforementioned liquefied gas cooling apparatuses, the refrigeration modules or the compressor modules except the modules during maintenance are subjected to optimization operation, and the number of modules to operate and which modules are to operate are determined such that a maximum number of modules that can be subjected to maintenance are concurrently subjected to maintenance, the maximum number being determined by resources of performance margin and maintenance personnel.

According to the present invention, the number of modules to operate and which modules are to operate are controlled such that a maximum number of modules that can be subjected to maintenance (the maximum number is determined by the resources of performance margin and maintenance personnel) can be concurrently subjected to maintenance, so that the maintenance of each compressor can be carried out without halting the operation of the system and without increasing the maintenance waiting time and maintenance personnel.

This is extremely advantageous in leveling out maintenance work and reducing the plant personnel for that work in an environment where many of the liquefied gas plants are provided in the sea or remote areas and the control of maintenance personnel and idle running are not easily taken and given from/to other plants for absorption.

Advantageous Effects of Invention

According to the present invention, the shaft sealing portions of the compressor drive shaft are removed, thereby preventing a slight amount of refrigerant leakage due to the presence of the shaft sealing portions. This can omit maintenance for regular refill of refrigerant and reduce maintenance costs, refrigerant costs for additional refill, and the like.

Moreover, the compressor contains the electric motor in the housing, there is no need to separately provide a driver for the compressor. Hence, the installation space for the refrigeration unit is reduced and the constraints of the layout of component machines in the plant are eased, which facilitates use in small-space plants.

DESCRIPTION OF EMBODIMENTS

Embodiments of the present invention will now be explained with reference to the drawings.

First Embodiment

A first embodiment of the present invention will now be explained with reference to FIGS. 1 and 2.

Figure 1:
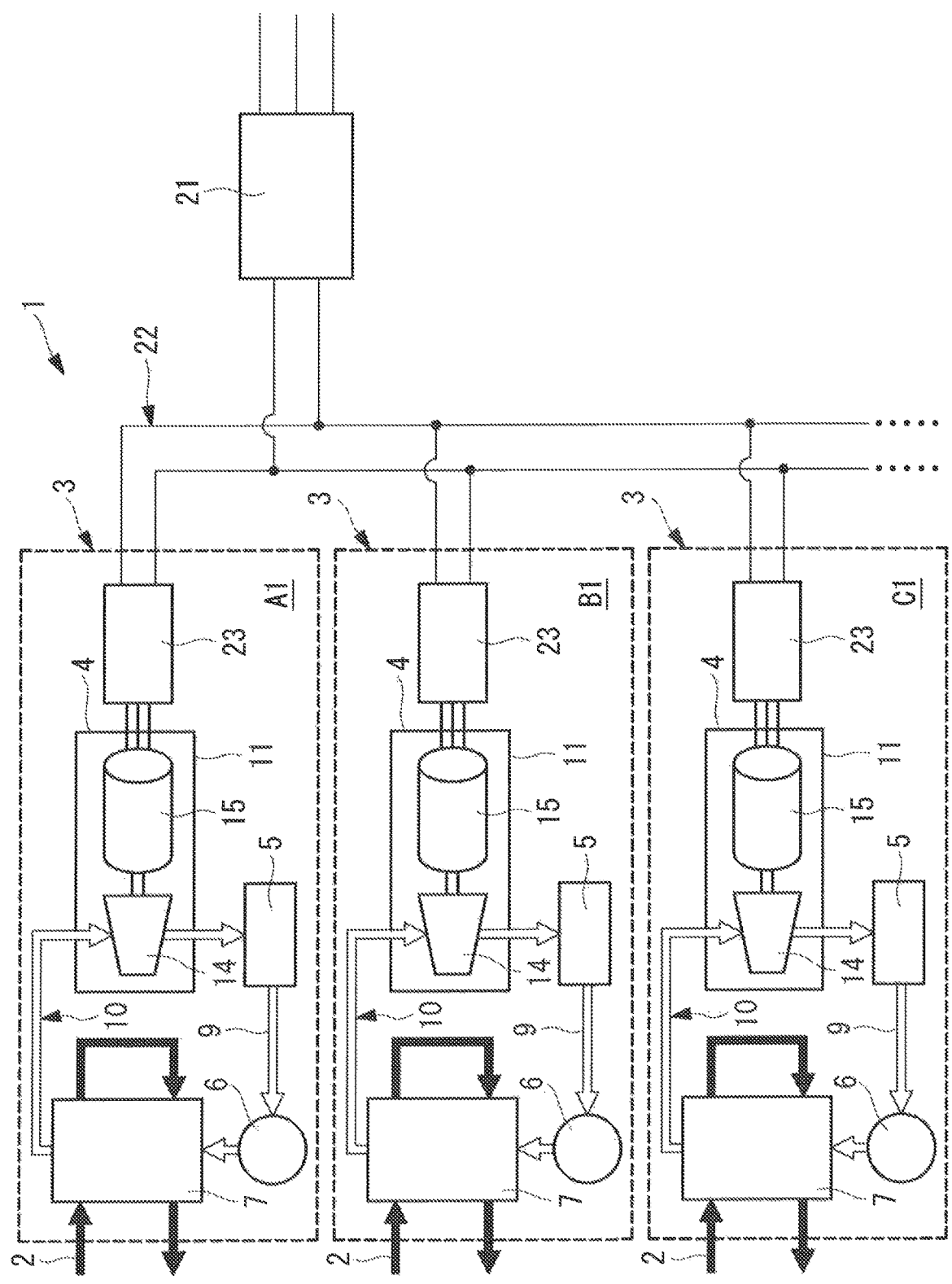
FIG. 1 is a partial configuration diagram of a liquefied gas cooling apparatus according to the first embodiment of the present invention.
Figure 2:
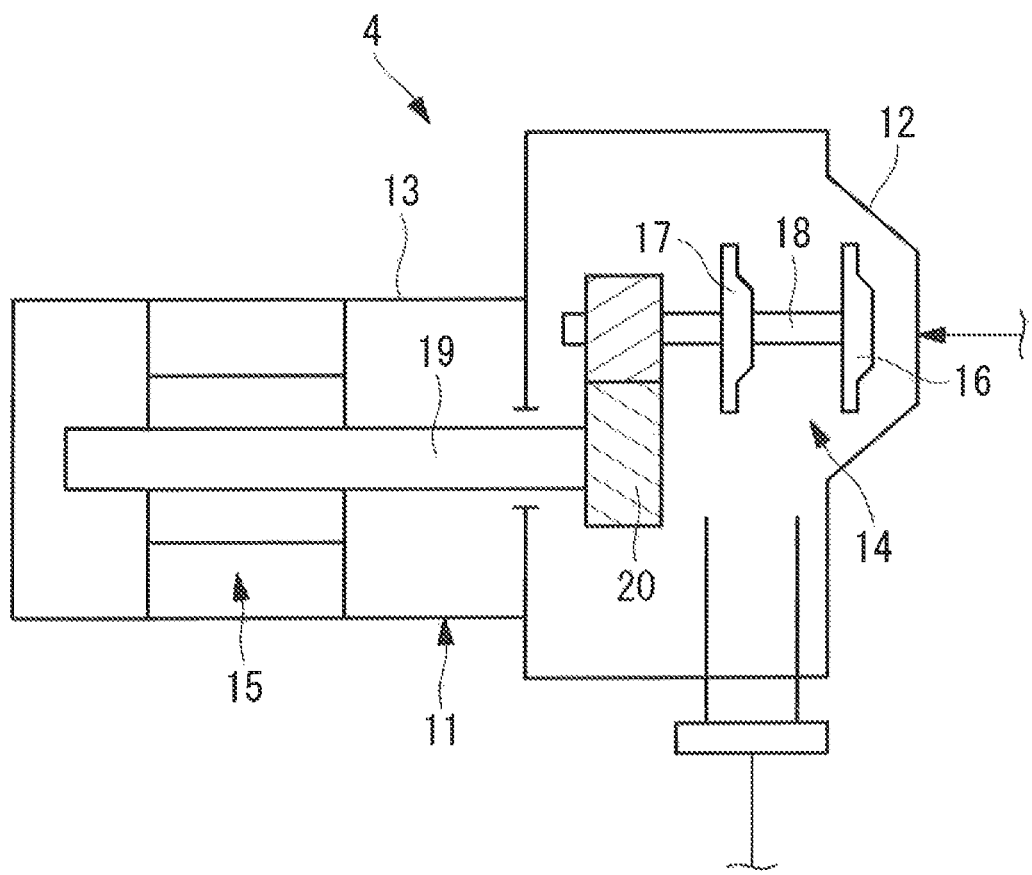
FIG. 2 is a schematic configuration diagram of a compressor in a refrigeration unit used for the liquefied gas cooling apparatus.

FIG. 1 is a partial configuration diagram of a liquefied gas cooling apparatus according to the first embodiment of the present invention, and FIG. 2 is a schematic configuration diagram of a compressor in a refrigeration unit used for that apparatus.

The liquefied gas cooling apparatus 1 includes gas flow paths 2 carrying a liquefied gas used as a feedstock, and refrigeration units 3 for cooling the liquefied gas in the gas flow paths 2 to a predetermined temperature.

Each refrigeration unit 3 includes, like a known one, a compressor 4 for compressing the refrigerant, a condenser 5 for condensation-liquefaction of the high-temperature and high-pressure refrigerant gas compressed by the compressor 4, a throttle expansion unit 6 for adiabatic expansion of the refrigerant condensed by the condenser 5, and an evaporator 7 for evaporation of the low-temperature and low-pressure refrigerant resulting from the adiabatic expansion by the throttle expansion unit 6, connected in this order through a refrigerant path 9, thereby forming a closed refrigerating cycle 10. Any expander or expansion valve may be used as the throttle expansion unit 6.

The refrigeration units 3 here are modularized as small-capacity refrigeration units 3. These refrigeration modules A1, B1, C1 . . . are connected to provide a needed cooling performance (necessary cooling performance).

Each gas flow path 2 carrying a natural gas to liquefy flows is sequentially cooled through the evaporator 7 of the refrigeration unit 3, and the gas is transferred to the downstream process to become a liquefied natural gas (LNG) at −162° C. The gas flow paths 2 may be connected to the multiple refrigeration modules A1, B1, C1 . . . in either parallel or series.

As shown in FIG. 2, the compressor 4 used in the refrigeration unit 3 is a sealed electric compressor containing a compressor mechanism 14 and an electric motor 15 in a sealed housing 11 consisting of a compressor housing 12 and a motor housing 13 coupled to each other through a bolt or the like. The compressor 4 here is a turbo compressor including upper and lower two impellers 16 and 17 having a rotation shaft 18 driven though a speed-up gear 20 with the use of a motor shaft 19 rotatably supported through a bearing not shown in the drawing.

The compressor 4, which is a two-stage compressor including upper and lower two impellers 16 and 17 here, may be a single-stage compressor or multiple-stage compressor with three or more stages, and although its rotation shaft 18 is driven through the speed-up gear 20 with the use of the motor shaft 19, it may be a direct-coupled compressor in which the rotation shaft 18 and the motor shaft 19 are integrally formed into one shaft.

The electric motors 15 in the compressors 4 are connected to an electric power circuit that feeds electric power from a power source, such as a power generator, through a grid interconnection converter 21, a power feeding circuit 22, and inverters 23 provided integrally to and modularized for the refrigeration modules A1, B1, and C1. This grid interconnection converter 21 is connected, via a direct current link, to the inverters 23 which are modularized, provided in multiple stages corresponding to multiple stages given by modularization of the refrigeration units 3 (A1, B1, and C1), and provided adjacent to the respective refrigeration modules A1, B1, and C1.

Since a cold source of a liquefied gas at −162° C. is present, a power line for connection between the power source, such as a power generator, and the grid interconnection converter 21, and the electric motor 15 may be, for example, a superconducting cable and a superconducting motor, respectively.

With the aforementioned configuration, this embodiment provides the following advantageous effects.

To generate a liquefied gas (LNG) by, for example, cooling a raw-material gas, such as a natural gas, using the liquefied gas cooling apparatus 1, the refrigeration units 3 modularized into multiple units and provided in multiple stages are operated, and the liquefied gas at room temperature flowing through the gas flow paths 2 are therefore sequentially cooled by the evaporators 7, i.e., first pre-cooled to about −30° C., further cooled, and then super-cooled to yield a liquefied gas (LNG) at −162° C.

The compressors 4 operated in a process for liquefaction cooling of this raw-material gas and included in the refrigeration modules A1, B1, and C1 require maintenance at predetermined operation intervals for change of consumable parts, such as a bearing. Each time, the compressors 4 are brought into the halt states, the refrigerants are collected from the interiors, and maintenance is then carried out.

In this embodiment, the refrigeration units 3 are modularized as low-capacity units, i.e., the refrigeration modules A1, B1, and C1 which are connected in parallel or in series to the gas flow paths 2. Accordingly, during maintenance, after the respective predetermined operation times, the operations of the compressors 4 may be sequentially halted for maintenance, and the other refrigeration modules are operated, so that the compressors 4 can be independently subjected to maintenance without halting the entire system with its operation continued.

Accordingly, during regular maintenance carried out at predetermined operation intervals for the compressors 4 of the refrigeration modules A1, B1, and C1, the compressors 4 can be independently subjected to maintenance while the operation of the system is continued with the operation of only these refrigeration modules in the halt states, so that the usage rate of the system can be improved.

The refrigeration units 3 are modularized as the refrigeration modules A1, B1, and C1 which are connected in parallel or in series to the gas flow paths 2 to achieve needed cooling performance.

For this reason, to provide the liquefied gas cooling apparatus 1 having the same performance, installation of multiple low-capacity refrigeration modules A1, B1, and C1 . . . results in high flexibility in the machine layout compared with installation of a single high-capacity refrigeration unit. Thus, in plants with small installation spaces, machine layout constraints can be eased and the capacity size of the liquefied gas cooling apparatus 1 can be flexibly selected.

The compressor 4 is a sealed compressor 4 driven through the electric motor 15 contained in the sealed housing 11 together with the compressor mechanism 14.

Hence, the shaft sealing portions of the compressor drive shaft (rotation shaft) 18 are removed, thereby preventing a slight amount of refrigerant leakage due to the presence of the shaft sealing portions. This can omit maintenance for regular refill of refrigerant and reduce maintenance costs, refrigerant costs for additional refill, and the like.

Since the compressor 4 contains the electric motor 15 in the housing 11 as described above, there is no need to separately provide a machine for driving the compressor 4.

Hence, the installation space for the refrigeration unit 3 is reduced and the constraints of the layout of component machines in the plant are eased, which facilitates use in small-space plants.

An electric power circuit connected to the electric motors 15 in the compressors 4 consists of a grid interconnection converter 21, a power feeding circuit 22, and inverters 23 provided integrally to and modularized for the refrigeration modules A1, B1, and C1, for feeding electric power from a power source, such as a power generator. This grid interconnection converter 21 is modularized and provided in multiple stages with an increase in the number of stages due to modularization of the refrigeration units 3 (A1, B1, and C1), and is connected to the inverters 23 on the respective refrigeration modules A1, B1, and C1 sides via a direct current link.

This facilitates connection with the refrigeration modules A1, B1, and C1.

Second Embodiment

A second embodiment of the present invention will now be explained with reference to FIG. 3.

In this embodiment, unlike the first embodiment, multiple modularized compressors 4 are connected in parallel in a refrigerating cycle 10. The other configuration is the same as in the first embodiment and will therefore not be explained.

Figure 3:
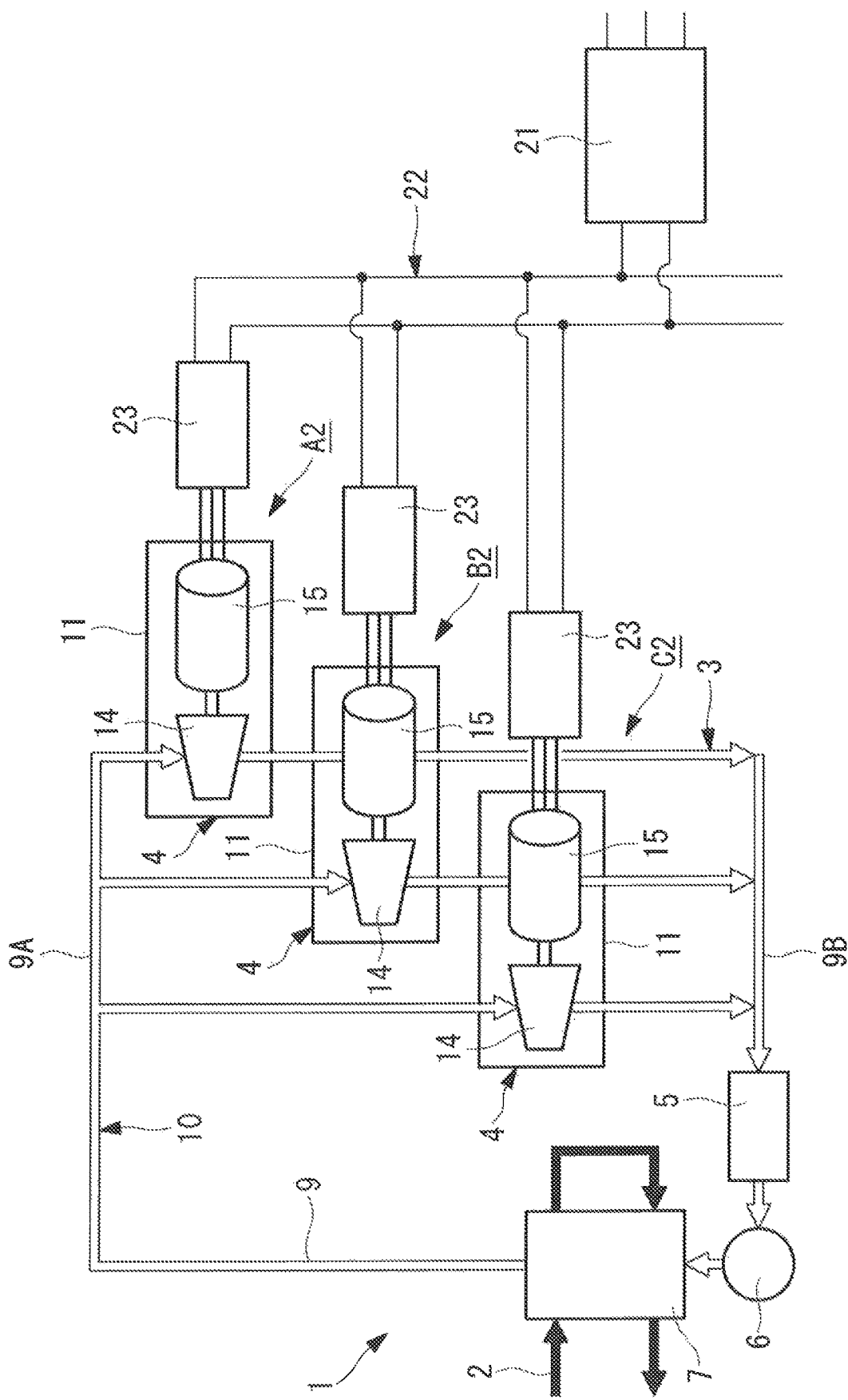
FIG. 3 is a partial configuration diagram of a liquefied gas cooling apparatus according to the second embodiment of the present invention.

As shown in FIG. 3, in a liquefied gas cooling apparatus 1 in this embodiment, the sealed compressors 4 with housings 11 containing compressor mechanisms 14 and electric motors 15 are modularized, a refrigeration unit 3 includes the multiple compressor modules A2, B2, C2 . . . connected in parallel between the inlet path 9A and the outlet path 9B of the refrigerating cycle 10, and the refrigeration unit 3 with this structure is placed in the gas flow path 2.

Like in the first embodiment, the electric motors 15 in the multiple compressor modules A2, B2, C2 . . . are connected to an electric power circuit that feeds electric power from a power source, such as a power generator, through a grid interconnection converter 21, a power feeding circuit 22, and inverters 23 provided integrally to and thus modularized for the compressor modules A2, B2, and C2.

With such a configuration in which the compressors 4 containing the electric motors 15 are modularized and the multiple compressor modules A2, B2, C2 . . . are connected in parallel in the refrigerating cycle 10 to achieve needed cooling performance, the liquefied gas cooling apparatus 1 having the same performance can be provided with low-capacity multiple compressor modules A2, B2, and C2 connected in parallel, which results in higher flexibility in the machine layout compared with the installation of a single high-capacity compressor.

Thus, in plants with small installation spaces, machine layout constraints can be eased and the capacity size of the liquefied gas cooling apparatus 1 can be flexibly selected.

In addition, during regular maintenance carried out at predetermined operation intervals for the compressors 4 of the refrigeration unit 3 while the operation of the system is continued with the operation of only any of the compressor modules A2, B2, and C2 in the halt state, the corresponding compressors 4 can be independently subjected to maintenance, so that the usage rate of the system can be increased.

An electric power circuit connected to the electric motors 15 in the compressor modules A2, B2, C2 . . . consists of a grid interconnection converter 21, a power feeding circuit 22, and inverters 23 provided integrally to and modularized for the compressor modules A2, B2, and C2, for feeding electric power from a power source, such as a power generator. This grid interconnection converter 21 is connected to the inverters 23 on the respective compressor modules A2, B2, and C2 sides via a direct current link. This facilitates connection with the compressor modules A2, B2, and C2.

Third Embodiment

A third embodiment of the present invention will now be explained with reference to FIG. 4.

This embodiment differs from the first embodiment in that it includes relays 24 provided to the power feeding circuit 22 for the compressors 4 of the refrigeration modules A1, B1, and C1. The other configuration is the same as in the first embodiment and will therefore not be explained.

Figure 4:
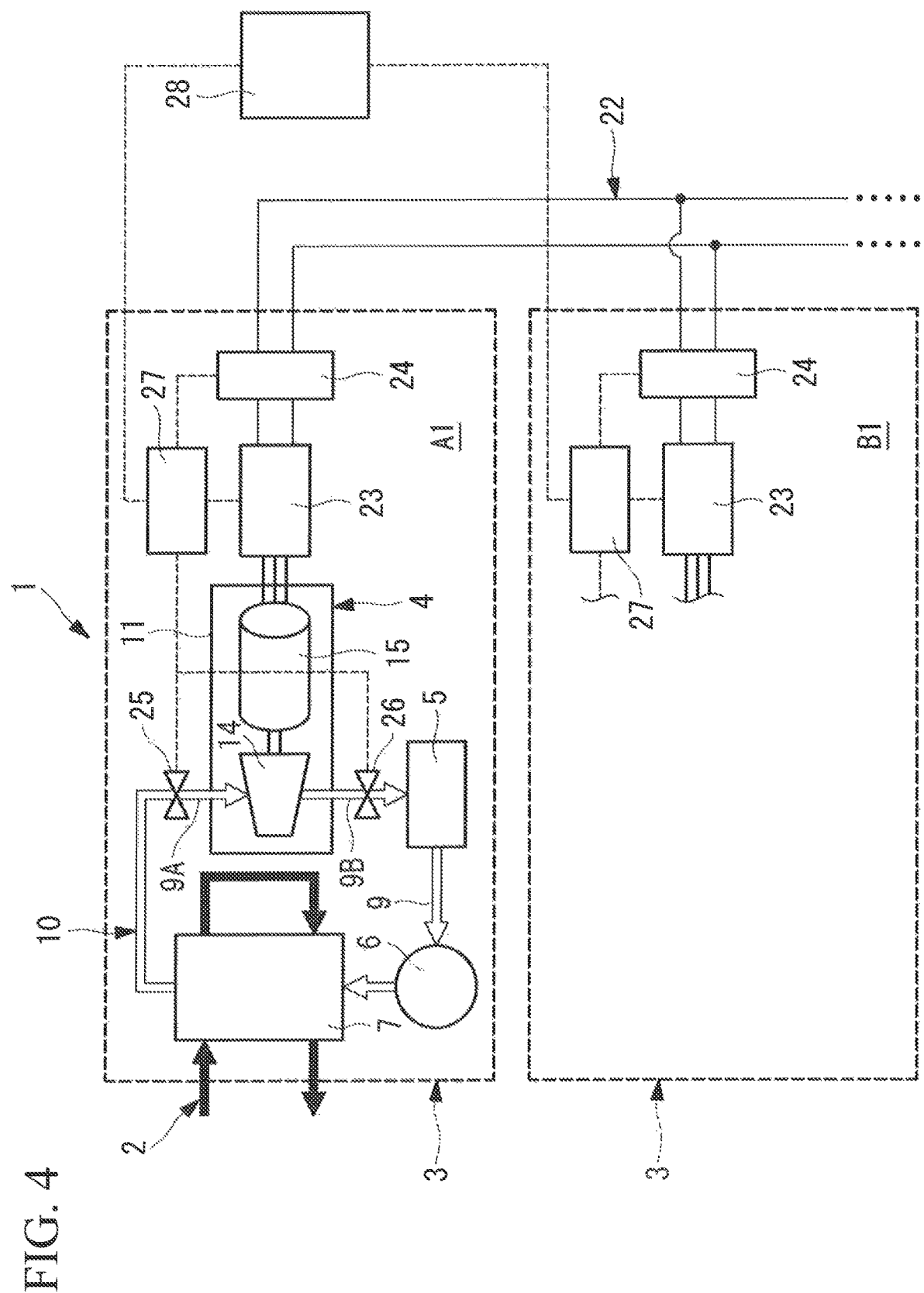
FIG. 4 is a partial configuration diagram of a liquefied gas cooling apparatus according to the third embodiment of the present invention.

As shown in FIG. 4, a liquefied gas cooling apparatus 1 according to this embodiment includes relays 24 provided to the power feeding circuit 22 for the inverters 23 for the electric motors 15 of the compressors 4 in the refrigeration modules A1, B1, and C1. During regular maintenance of the compressors 4, the relays 24 block the electric paths for the compressors 4 and bring the power sections of the compressors, which are halted for maintenance, into electrically non-conducting states to enable maintenance.

To be specific, in this embodiment, the relays 24 are provided to the power feeding circuit 22 for the inverters 23 and are turned on/off according to the opening/closing of open/close valves 25 and 26 for maintenance provided to the inlet path 9A and the outlet path 9B of the compressors 4.

Maintenance such as the change of consumable parts of the compressors 4 requires collection of the refrigerants from the refrigerating cycles 10; thus, the open/close valves 25 and 26 are provided to the inlet path 9A and outlet path 9B of the compressors 4 and the open/close valves 25 and 26 break the refrigerating cycles 10 to collect only the refrigerants in the compressors 4.

This facilitates the maintenance and shortens the time for the maintenance.

The operation time of each compressor 4 is counted by the corresponding controller 27 or host controller 28. After a lapse of a predetermined operation time, the operation of the compressor 4 is artificially or automatically halted. Subsequently, the open/close valves 25 and 26 for maintenance are manually or automatically closed.

After these open/close valves 25 and 26 for maintenance are closed, the refrigerant in the compressor 4 is collected and maintenance is then carried out. At this time, there is danger of electrical shock if the power section including the inverter 23 and the electric motor 15 is still in an electrically conducting state. Accordingly, the relays 24 are turned off according to the closing of the open/close valves 25 and 26 for maintenance so that the power section can be brought into an electrically non-conducting state.

Maintenance for each compressor 4 is carried out in the following manner.

(1) The operation time of the compressor 4 is counted by the corresponding controller 27 or host controller 28. After a lapse of a predetermined operation time, an alarm is given through an appropriate means, so that a necessity of maintenance is determined; thus, the operation of the refrigeration unit 3 (compressor 4) is artificially or automatically halted.

(2) After the compressor 4 is brought into the halt state, the open/close valves 25 and 26 for maintenance provided to the inlet path 9A and the outlet path 9B are manually or automatically closed to break the refrigerating cycle 10; thus, the compressor 4 is separated from the refrigerating cycle 10, the relay 24 is turned off, and the power section of the compressor 4 is brought into the electrically non-conducting state.

(3) In this state, the refrigerant in the compressor 4 is collected using a refrigerant collecting machine or the like into a tank on the refrigerant collecting machine side.

(4) Afterwards, needed maintenance, e.g., the change of consumable parts, such as bearings, in the compressor 4 is carried out.

(5) After the maintenance is terminated, the compressor 4 is evacuated using a vacuum pump and refilled with a necessary amount of refrigerant using a refrigerant filling machine.

(6) After the refilling of the refrigerant is terminated, the open/close valves 25 and 26 for maintenance provided to the inlet path 9A and the outlet path 9B are opened, so that the maintenance work is completed and the compressor 4 and the refrigeration unit 3 are ready for operation.

As for the above-described maintenance, after a lapse of a predetermined operation time, the operations of particular refrigeration modules A1, B1, and C1 are artificially halted upon an alarm from the controllers 27 and 28 or the like, and the open/close valves 25 and 26 for maintenance are manually closed; thus, no particular problem arises in starting maintenance. However, when the operations of particular refrigeration modules are automatically halted through the controllers 27 and 28 or the like and the open/close valves 25 and 26 are closed to provide a maintenance waiting state, it is preferable that an alarm be given in advance and halts be executed after a predetermined delay time in order to avoid sudden halts of the refrigeration modules A1, B1, and C1 and the compressor 4.

For turning on/off the relay 24 according to the opening/closing of the open/close valves 25 and 26 for maintenance, a control scheme is used in which a valve signal is taken in a microprocessor through the controller 27 and an on/off signal is sent to the relay 24 through a control program.

Alternatively, a digital signal circuit scheme may be used in which the relay 24 is turned on/off through a relay circuit operating according to signals from on/off switches attached to the open/close valves 25 and 26.

Alternatively, both of the schemes are employed as a duplexed system to increase the reliability.

Instead of the opening/closing of the open/close valves 25 and 26 for maintenance, a protection lock, or a control panel door which needs to be unlocked for maintenance may be used as an alternative means. Alternatively, the relay 24 may additionally have a function of outputting answerback signals; thus, if there is a difference between the states of the open/close valves 25 and 26 for maintenance and the state of the relay 24, an anomaly is determined and the upstream grid interconnection converter 21 is turned off to bring the entire system to a halt.

Meanwhile, as for the multiple refrigeration modules A1, B1, and C1 (or the multiple compressor modules A2, B2, and C2 of the aforementioned second embodiment), the host controller 28 controls the number of modules to operate, in the following manner.

(1) The operations of the multiple refrigeration modules A1, B1, and C1 (or compressor modules A2, B2, and C2) are controlled such that the number of modules to operate is controlled according to the needed cooling performance depending on fluctuations in the flow rate of the liquefied gas and in the temperature of the gas flowing in.

Figure 5:
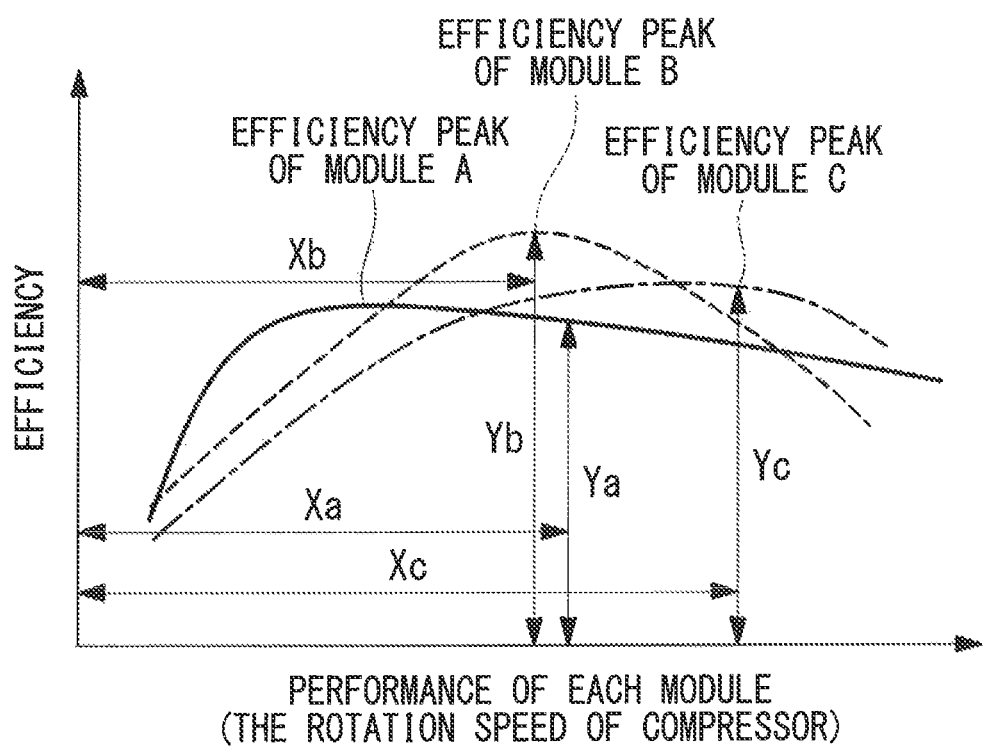
FIG. 5 is a graph for explaining efficiencies during the operation of a liquefied gas cooling apparatus according to the present invention.

(2) At this time, the range of the performance of each module can be adjusted by the inverter 23. A comparison is performed between the efficiency produced by reducing the number of modules to operate, and the efficiency produced by reducing the performance by reducing the rotation speed of the compressor of each module, and the adjustment is performed by one of these with higher efficiency. For example, if the comparison shows that reducing the number of modules to operate results in higher operation efficiency, reducing the number of modules to operate is determined and control is performed. The relationship between each module's performance (the rotation speed of compressor) and the efficiency is as shown in FIG. 5, for example, and operation control is performed such that $$\{(Xa*Ya)+(Xb*Yb)+(Xc*Yc)\}$$

becomes maximum.

As for the refrigeration unit 3, in particular, which exchanges heat with a liquefied gas the temperature of which greatly changes with sensible heat variations, the performance quality relative to the rotation speed greatly changes depending on the temperature range in which it is used; therefore, the efficiency is preferably calculated for different estimated operation conditions.

(3) To select the control of the number of modules to operate or the control of the rotation speed of the compressor in (2), the maintenance cost per operation time of the compressor which is calculated by dividing the cost of regular maintenance of the compressor by maintenance interval is added to the electric power cost and comparison and determination are then made.

To be specific, operation control is performed such that $$\{\{Xa*(Ya-Za)\}+\{Xb*(Yb-Zb)\}+\{Xc*(Yc-Zc)\}\}$$

(here, Zn is a correction value obtained by converting the maintenance cost to a decrease in efficiency.) becomes maximum.

(4) In (2) and (3), the modules except those during maintenance are subjected to optimization operation, and the number of modules to operate and which modules are to operate are determined such that a maximum number of modules that can be subjected to maintenance (the maximum number is determined by the resources of performance margin and maintenance personnel) can be concurrently subjected to maintenance.

This embodiment described above provides the following advantageous effects.

First, electric power from the power source can be supplied to the electric motor 15 of the compressor 4 in each module via the grid interconnection converter 21 and the inverter 23, and the relay 24 is provided to the corresponding power feeding circuit 22. Hence, during regular maintenance of the compressor 4, the electric path to the compressor 4 is blocked through the relay 24 provided to the power feeding circuit for each compressor 4, thereby allowing for maintenance.

Accordingly, the power section of the compressor 4 halted for maintenance can be brought into an electrically non-conducting state for performing maintenance, so that the operator's safety can be ensured.

The relay 24 is turned on/off according to the opening/closing of the open/close valves 25 and 26 for maintenance provided to the inlet path and the outlet path of the compressor 4.

Accordingly, after a lapse of the regular maintenance time (operation time) for the compressor 4, the compressor 4 is artificially or automatically brought into a halt state. If the open/close valves 25 and 26 for maintenance provided at its inlet and outlet are closed, the relay 24 is turned off according to that action and the electric path to the compressor 4 can be blocked.

Thus, when the compressor 4 is subjected to maintenance, its power section is reliably brought into an electrically non-conducting state, thereby more reliably ensuring the maintenance operator's safety.

In addition, when the compressor 4 is artificially or automatically halted after a lapse of a predetermined operation time, the open/close valves 25 and 26 for maintenance are manually or automatically closed. The closing of the open/close valves 25 and 26 is detected and the relay 24 is turned off, which blocks the electric path to the compressor 4; thus, the compressor 4 is ready for maintenance.

Hence, if the controller 27, the host controller 28, or the like counts the regular maintenance time (operation time) of the compressor 4 and the compressor 4 is halted, the open/close valves 25 and 26 for maintenance are manually or automatically closed, which is detected by the controller 27 or 28, or the like so that the relay 24 can be turned off.

Accordingly, the electric path to the compressor 4 is blocked so that the power section can be brought into an electrically non-conducting state and the compressor 4 can be ready for maintenance. Consequently, the regular maintenance of the compressor 4 and the process before the maintenance can be reliably controlled and the operator's safety can be ensured.

In addition, in this embodiment, the number of refrigeration modules A1, B1, and C1 or compressor modules A2, B2, and C2 to operate is controlled according to the needed cooling performance depending on fluctuations in the flow rate of the liquefied gas and in the temperature of the gas flowing in.

For this reason, the refrigeration modules A1, B1, and C1 or the compressor modules A2, B2, and C2 are operated while the number of these modules is controlled according to fluctuations in the flow rate of the liquefied gas and in the temperature of the gas flowing in, so that the optimum performance for the cold energy needed for the cooling of the liquefied gas can be provided. This saves excess electric power consumed for the cooling operation for the liquefied gas, resulting in a lean cooling operation.

At this time, the performances of the modules (A1, B1, and C1 or A2, B2, and C2) are adjustable by the inverters 23 in such a manner that a comparison is performed between the efficiency produced by adjusting the performance by controlling the number of modules to operate, and the efficiency produced by adjusting the performance by controlling the rotation speed of the compressor, and the adjustment is performed by one of these with higher efficiency.

For this reason, the range of the performances of the refrigeration modules A1, B1, and C1 or the compressor modules A2, B2, and C2 can be adjusted by the inverters 23 in such a manner that a comparison is performed between the efficiency produced by reducing the number of modules to operate, and the efficiency produced by reducing the performance by reducing the rotation speed of the compressor, and the adjustment can be performed by one of these with higher efficiency.

For example, if the efficiency produced by reducing the number of modules to operate is higher, a control is performed such that the number of modules (A1, B1, and C1 or A2, B2, and C2) to operate is reduced, so that the electric power consumed for the cooling operation is minimized.

As for the refrigeration unit 3, in particular, which exchanges heat with a liquefied gas the temperature of which greatly changes with sensible heat variations, the performance quality relative to the rotation speed greatly changes depending on the temperature range in which it is used; therefore, the efficiency is preferably calculated for different estimated operation conditions so that excess electric power consumed for the cooling operation can be minimized.

In addition, to select the control of the number of modules to operate or the control of the rotation speed of the compressor, the maintenance cost per operation time of the compressor 4 which is calculated by dividing the cost of regular maintenance of the compressor 4 by maintenance interval may be added to the electric power cost and comparison and determination may then be made.

Thus, to select the control of the number of modules to operate or the control of the rotation speed of the compressor, the maintenance cost per operation time of the compressor 4 can be added to the electric power cost and comparison and determination can then be made.

Hence, a cooling operation with high efficiency can be performed considering the electric power consumption and the maintenance cost. As for the refrigeration unit 3, in particular, which exchanges heat with a liquefied gas the temperature of which greatly changes with sensible heat variations, the load on the compressor 4 changes depending on the temperature range in which it is used. For this reason, the coefficient of maintenance cost and the maintenance interval for the compressor 4 are preferably variable with the temperature range in which it is used.

In addition, in this embodiment, the refrigeration modules A1, B1, and C1 or the compressor modules A2, B2, and C2 except the modules during maintenance are subjected to optimization operation, and the number of modules to operate and which modules are to operate are determined such that a maximum number of modules that can be subjected to maintenance (the maximum number is determined by the resources of performance margin and maintenance personnel) can be concurrently subjected to maintenance.

Thus, the number of modules to operate and which modules are to operate are controlled such that a maximum number of modules that can be subjected to maintenance (the maximum number is determined by the resources of performance margin and maintenance personnel) can be concurrently subjected to maintenance, so that the maintenance of each compressor can be carried out without halting the operation of the system and without increasing the maintenance waiting time and maintenance personnel.

This can be said to be extremely advantageous in leveling out maintenance work and reducing the plant personnel for that work in an environment where many of the plants using the liquefied gas cooling apparatus 1 are provided in the sea or remote areas and a rotation of the control of maintenance personnel and idle running for leveling between the plants is difficult.

The present invention should not be limited to the invention according to the above-described embodiments and appropriate modifications can be made without departing from the scope of the present invention. For example, although the above-described embodiments use turbo compressors as the compressors 4 used in the refrigeration units 3, this is not necessarily the case: other types of compressors, such as screw compressors and reciprocating compressors, may be used instead. Needless to say, the liquefied gas cooling apparatus 1 according to the present invention can also be used for liquefaction of a liquefied gas other than natural gas.

In addition, the compressors 4 in the refrigeration modules A1, B1, and C1 and the compressor modules A2, B2, and C2 are all driven with inverters in the above-described embodiments; alternatively, part of the compressors 4 may be driven with inverters, and the other compressors may be constant-speed compressors.

Further, the above-described embodiments all show the case where the power feeding circuit 22 is provided for feeding power to the electric motors 15 of the compressors 4 via the grid interconnection converter 21 and the inverters 23; alternatively, the power feeding circuit 22 should not necessarily include the grid interconnection converter 21 and the inverters 23 and, in this case, the relays 24 are provided to the power feeding circuit 22 for the electric motors 15 so that the relays 24 can block the electric paths during maintenance, bringing the power sections into electrically non-conducting states.

REFERENCE SIGNS LIST 1 liquefied gas cooling apparatus
2 gas flow path
3 refrigeration unit
4 compressor
5 condenser
6 throttle expansion unit
7 evaporator
9 refrigerant path
10 refrigerating cycle
11 housing
14 compressor mechanism
15 electric motor
21 grid interconnection converter
22 power feeding circuit
23 inverter
24 relay
25, 26 open/close valve for maintenance
27 controller
28 host controller
A1, B1, C1 refrigeration module
A2, B2, C2 compressor module

The invention claimed is:

1. A liquefied gas cooling apparatus comprising:
a plurality of refrigeration units that cool liquefied gas flowing in a gas flow path, wherein
the refrigeration units each include an evaporator [n1], a compressor, a condenser, and a throttle expansion unit that form a refrigeration cycle,
each evaporator is connected in parallel or series to the gas flow path,
the refrigeration units each cool the liquified gas flowing in the gas flow path by using each evaporator,
each compressor includes:
a sealed housing;
a compressor mechanism contained in the housing; and
an electric motor contained in the housing together with the compressor mechanism and receiving electric power via an inverter,
the compressor being driven by the electric motor,
cooling performance of each of the refrigeration units is adjustable by each inverter that supplies electric power to each electric motor,
the plurality of the refrigeration units are configured to obtain a predetermined cooling performance,
the number of the plurality of the refrigeration units to operate is controlled according to a cold energy quantity of the liquefied gas cooling apparatus that varies depending on variations in the flow rate and in the temperature of the liquefied gas flowing in the gas flow path,
a comparison is performed between an operation efficiency produced by adjusting the cooling performance by controlling the number of the plurality of the refrigeration units to operate, and an efficiency produced by adjusting the performance by controlling the rotation speed of each compressor, and adjustment is performed so as to achieve higher efficiency, and
to select either an adjustment by controlling the number of the refrigeration units to operate or an adjustment by controlling the rotation speed of each compressor, a total of maintenance cost per operation time of each compressor calculated by dividing the cost of regular maintenance of each compressor by maintenance interval of each compressor is added to a total of electric power cost of each compressor for comparison, and determination is then made to select either the adjustment by controlling the number of the plurality of the refrigeration units to operate or the adjustment by controlling the rotation speed of each compressor.

2. A liquefied gas cooling apparatus comprising:
a plurality of refrigeration units that cool a liquefied gas flowing in a gas flow path, wherein
the refrigeration units each include a compressor, a condenser, and a throttle expansion unit that form a refrigeration cycle,
each evaporator is connected in parallel or series to the gas flow path,
the refrigeration units each cool the liquified gas in the gas flow path by using each evaporator,
each compressor includes:
a sealed housing;
a compressor mechanism contained in the housing; and
an electric motor contained in the housing together with the compressor mechanism and receiving electric power via an inverter,
the compressor being driven by the electric motor,
cooling performance of each of the refrigeration units is adjustable by each inverter that supplies electric power to each electric motor,
the plurality of the refrigeration units are configured to obtain a predetermined cooling performance,
the number of the plurality of the refrigeration units to operate is controlled according to a cold energy quantity of the liquefied gas cooling apparatus that varies depending on variations in the flow rate and in the temperature of the liquefied gas flowing in the gas flow path,
a comparison is performed between an operation efficiency produced by adjusting the cooling performance by controlling the number of the plurality of the refrigeration units to operate, and an operation efficiency produced by adjusting the cooling performance by controlling the rotation speed of each compressor, and adjustment is performed so as to achieve higher efficiency, and
the refrigeration units operated in such a way that the number of the refrigeration units to operate and which refrigeration units are to operate are determined to make a maximum number of maintainable units concurrently subjected to maintenance, the maximum number being determined by resources of performance margin and maintenance personnel.

3. The liquefied gas cooling apparatus according to claim 1, wherein the refrigeration units are operated in such a way that the number of the refrigeration units to operate and which refrigeration units are to operate are determined to make a maximum number of maintainable units concurrently subjected to maintenance, the maximum number being determined by resources of performance margin and maintenance personnel.

4. A liquefied gas cooling apparatus comprising:
a refrigeration unit that cools a liquefied gas flowing in a gas flow path, wherein
the refrigeration unit includes an evaporator, a plurality of compressors connected in parallel to the evaporator, a condenser, and a throttle expansion unit that form a refrigeration cycle,
the refrigeration unit cools the liquified gas in the gas flow path by using the evaporator,
the compressors each include:
a sealed housing;
a compressor mechanism contained in the housing; and
an electric motor contained in the housing together with the compressor mechanism and receiving electric power via an inverter,
each of the compressors being driven by the electric motor,
the rotation speed of each of the compressors is adjustable by the inverter,
the plurality of the compressors are configured to obtain a predetermined cooling performance,
the number of the compressors to operate is controlled according to a cold energy quantity of the liquefied gas cooling apparatus that varies depending on variations in the flow rate and in the temperature of the liquefied gas flowing in the gas flow path,
a comparison is performed between an operation efficiency produced by adjusting the cooling performance by controlling the number of the plurality of the compressors to operate, and an operation efficiency produced by adjusting the cooling performance by controlling the rotation speed of each of the compressors, and adjustment is performed so as to achieve higher efficiency, and to select either an adjustment by controlling the number of the plurality of the compressors to operate or an adjustment by controlling the rotation speed of each of the compressors, a total of maintenance cost per operation time of each of the compressors calculated by dividing the cost of regular maintenance of each of the compressors by maintenance interval of each of the compressors is added to a total of electric power cost of each of the compressors for comparison, and determination is then made to select either the adjustment by controlling the number of the plurality of compressors to operate or the adjustment by controlling the rotation speed of each of the compressors.

5. A liquefied gas cooling apparatus comprising:
a refrigeration unit that cools a liquefied gas flowing in a gas flow path, wherein
the refrigeration unit includes a plurality of compressors connected in parallel to the evaporator, a condenser, and a throttle expansion unit that form a refrigeration cycle,
the refrigeration unit cools the liquefied gas in the gas flow path by using the evaporator,
the compressors each include:
a sealed housing;
a compressor mechanism contained in the housing; and
an electric motor contained in the housing together with the compressor mechanism and receiving electric power via an inverter,
each of the compressors being driven by the electric motor,
the rotation speed of each of the compressors is adjustable by the inverter,
the plurality of the compressors are configured to obtain a predetermined cooling performance,
the number of the compressors to operate is controlled according to a cold energy quantity of the liquefied gas cooling apparatus that varies depending on variations in the flow rate and in the temperature of the liquefied gas flowing in the gas flow path,
a comparison is performed between an operation efficiency produced by adjusting the cooling performance by controlling the number of the plurality of the compressors to operate, and an operation efficiency produced by adjusting the cooling performance by controlling the rotation speed of each of the compressors, and adjustment is performed so as to achieve higher efficiency, and
the compressors are operated in such a way that the number of the compressors to operate and which compressors are to operate are determined to make a maximum number of maintainable units concurrently subjected to maintenance, the maximum number being determined by resources of performance margin and maintenance personnel.

6. The liquefied gas cooling apparatus according to claim 4, wherein the compressors are operated in such a way that the number of the compressors to operate and which compressors are to operate are determined to make a maximum number of maintainable units concurrently subjected to maintenance, the maximum number being determined by resources of performance margin and maintenance personnel.

7. A liquefied gas cooling apparatus comprising:
a refrigeration unit that cools a liquefied gas flowing in a gas flow path, wherein
the refrigeration unit includes, a compressor, a condenser, and a throttle expansion unit that form a refrigeration cycle,
the refrigeration unit cools the liquefied gas in the gas flow path by using each evaporator,
the compressor includes:
a sealed housing;
a compressor mechanism contained in the housing; and
an electric motor contained in the housing together with the compressor mechanism and receiving electric power via an inverter,
the compressor being driven by the electric motor,
the electric motor included in the compressor is provided with a relay to a power feeding circuit, and
open/close valves for maintenance capable of blocking the compressor from the refrigerating cycle are provided in a refrigerant path connected to an inlet of the compressor and in a refrigerant path connected to an outlet of the compressor,
the relay is turned on when the open/close valves for maintenance are opened, and the relay is turned off when the open/close valves for maintenance are closed.

8. The liquefied gas cooling apparatus according to claim 7, wherein a plurality of refrigeration units are configured to obtain a predetermined cooling performance, and
each evaporator is connected in parallel or series to the gas flow path.

9. The liquefied gas cooling apparatus according to claim 7, wherein a plurality of compressors are configured to obtain a predetermined cooling performance, and
the plurality of the compressors are connected in parallel to the refrigerating cycle.

10. The liquefied gas cooling apparatus according to claim 7, wherein the inverter is provided on an upstream-side circuit of the relay provided on the power feeding circuit for the electric motor, and
the inverter can receive electric power from a power source via a grid interconnection converter.

11. The liquefied gas cooling apparatus according to claim 7, wherein when the compressor is artificially or automatically halted after a lapse of a predetermined operation time, the open/close valves for maintenance are manually or automatically closed, the closing of the open/close valves are detected to turn off the relay, and an electric path to the compressor is blocked to get the compressor ready for the maintenance.

12. The liquefied gas cooling apparatus according to claim 8, wherein the number of the plurality of the refrigeration units to operate is controlled according to a cold energy quantity of the liquefied gas cooling apparatus that varies depending on variations in the flow rate and in the temperature of the liquefied gas flowing in the gas flow path.

* * * * *